(12) United States Patent
Chien et al.

(10) Patent No.: US 8,886,902 B1
(45) Date of Patent: Nov. 11, 2014

(54) DISK BACKUP SET ACCESS

(75) Inventors: Yawen Chien, Pleasanton, CA (US);
Asit Desai, San Ramon, CA (US);
Richard Zulch, Orinda, CA (US)

(73) Assignee: EMC Corporation, Hopkinton, MA (US)

( * ) Notice: Subject to any disclaimer, the term of this patent is extended or adjusted under 35 U.S.C. 154(b) by 320 days.

(21) Appl. No.: 11/345,859

(22) Filed: Feb. 2, 2006

(51) Int. Cl.
*G06F 12/00* (2006.01)

(52) U.S. Cl.
USPC .......................................... 711/162

(58) Field of Classification Search
CPC ............ G06F 11/1446; G06F 11/1458; G06F 11/1471
USPC ........................................ 707/200
See application file for complete search history.

(56) References Cited

U.S. PATENT DOCUMENTS

| | | | |
|---|---|---|---|
| 5,150,473 A | 9/1992 | Zulch | |
| 5,491,752 A | 2/1996 | Kaufman et al. | |
| 5,673,381 A | 9/1997 | Huai et al. | |
| 5,778,395 A | 7/1998 | Whiting et al. | |
| 6,003,044 A | 12/1999 | Pongracz et al. | |
| 6,023,506 A | 2/2000 | Ote et al. | |
| 6,038,379 A | 3/2000 | Fletcher et al. | |
| 6,044,155 A | 3/2000 | Thomlinson et al. | |
| 6,076,164 A | 6/2000 | Tanaka et al. | |
| 6,199,178 B1 | 3/2001 | Schneider et al. | |
| 6,721,766 B1 | 4/2004 | Gill et al. | |
| 7,558,840 B1 | 7/2009 | Howard et al. | |
| 7,587,749 B2 | 9/2009 | Leser et al. | |
| 7,689,861 B1 | 3/2010 | Wang et al. | |
| 7,693,889 B1 | 4/2010 | Armorer et al. | |
| 8,065,273 B2 | 11/2011 | Yueh et al. | |
| 2002/0073043 A1 | 6/2002 | Herman et al. | |
| 2002/0184244 A1 | 12/2002 | Hsiao et al. | |
| 2003/0046589 A1 | 3/2003 | Gregg | |
| 2003/0158960 A1 | 8/2003 | Engberg | |
| 2003/0172130 A1 | 9/2003 | Fruchtman et al. | |
| 2003/0187853 A1 | 10/2003 | Hensley et al. | |
| 2004/0078641 A1 | 4/2004 | Fleischmann | |
| 2004/0107199 A1 | 6/2004 | Dalrymple, III et al. | |
| 2005/0033988 A1 | 2/2005 | Chandrashekhar et al. | |
| 2005/0193031 A1* | 9/2005 | Midgley et al. | 707/200 |
| 2005/0289533 A1 | 12/2005 | Wang et al. | |
| 2006/0047694 A1 | 3/2006 | Anderson et al. | |
| 2006/0085675 A1 | 4/2006 | Popell et al. | |
| 2006/0101081 A1* | 5/2006 | Lin et al. | 707/200 |
| 2006/0149889 A1 | 7/2006 | Sikha | |
| 2006/0174076 A1 | 8/2006 | Takeda et al. | |
| 2007/0061385 A1 | 3/2007 | Clark et al. | |
| 2007/0180289 A1 | 8/2007 | Chai et al. | |
| 2008/0304486 A1 | 12/2008 | Graessley et al. | |

* cited by examiner

Primary Examiner — Baboucarr Faal
(74) Attorney, Agent, or Firm — Van Pelt, Yi & James LLP (57) ABSTRACT

Controlling backup data access is disclosed. A request is received to access backup data in a requested mode, wherein backup data is accessed based at least in part on a restore point. It is determined if the requested mode is allowed given a currently executing mode. In the event that the mode is allowed, access to backup data is allowed.

37 Claims, 6 Drawing Sheets

Access Modes Currently in Execution

| Access Mode Requested | | None | Read | Read Exclusive | Write | Write Exclusive |
|---|---|---|---|---|---|---|
| | Read | Allowed | Allowed | Not Allowed | Allowed | Not Allowed |
| | Read Exclusive | Allowed | Not Allowed | Not Allowed | Not Allowed | Not Allowed |
| | Write | Allowed | Allowed | Not Allowed | Not Allowed | Not Allowed |
| | Write Exclusive | Allowed | Not Allowed | Not Allowed | Not Allowed | Not Allowed |

FIG. 6A [Single Write/Multi Read]

Access Modes Currently in Execution

| Access Mode Requested | | None | Read | Read Exclusive | Write | Write Exclusive |
|---|---|---|---|---|---|---|
| | Read | Allowed | Allowed | Not Allowed | Allowed | Not Allowed |
| | Read Exclusive | Allowed | Not Allowed | Not Allowed | Not Allowed | Not Allowed |
| | Write | Allowed | Allowed | Not Allowed | Allowed | Not Allowed |
| | Write Exclusive | Allowed | Not Allowed | Not Allowed | Not Allowed | Not Allowed |

FIG. 6B [Multi Write / Multi Read]

DISK BACKUP SET ACCESS

BACKGROUND OF THE INVENTION

Some applications traditionally have been run exclusively by system administrators. In some cases, this is because the application requires access to information beyond the privileges of any individual user. For example, a backup application may require access to all user data, essentially requiring system administrator access privileges, in order to provide a comprehensive service. In other cases, this is because the application can only perform one operation at a time so that the system administrator must decide which operation has priority. For example, a backup application may allow only one instance to be running and accessing its catalog so that the backup application cannot restore a file at the same time as a backup or transfer is in operation. However, if the system administrator is the only one able to run certain applications, the system administrator becomes a bottleneck. And also, if there is only one operation allowed at a time, then the application itself is a bottleneck. It would be useful to enable users as well as administrators to run all, or certain modes, of the applications themselves while still preserving access limitations as well as be able to run these modes concurrently. In particular, in the context of backup applications it would be useful to enable an individual user (or administrator) to access and use a backup application and associated backup data to restore the user's own files and/or other data, and when possible, to permit a user to perform such an operation at the same time one or more other non-conflicting operations are being performed with respect to the same backup data set, e.g., by an administrator or another user.

In current practice, backup systems such as VERITAS NetBackup™ or CONNECTED Online Backup offer an ability for multiple users to simultaneously access backup data sets. However, retrieval is limited to the following forms: 1) the user can provide search criteria and retrieve the matching files, for example all .DOC files backed up in a date range from a certain computer; 2) the user can select a specific file and retrieve one or more prior versions by date; or 3) the user can select a specific directory and retrieve the most recent versions of the files contained therein. But what is needed is an ability to obtain an index of the state of a given backed-up disk volume at the previous points in time where a backup has been performed, and then select files for retrieval from that index at a specific point in time. For example, when working on a project involving several documents of different types, it might be desirable to obtain a copy of the documents that were current as of a given date in the past, as might have been delivered together to a customer. As of the target date, some files might have been modified a day before, and some a week before. Then later any of the files might be modified at different times. Some files that were previously part of the project might have been moved, renamed, or deleted as of the target date. A common solution is to retrieve too many files, and then manually delete the newer revisions and any deleted files as of the target date. This is a laborious and error-prone process. It would be better if the files could be obtained conveniently in one step and also simultaneously by more than one user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing multiple user concurrent access to backup data is disclosed. A request is received, e.g., from a user, a client, or an administrator, to perform an operation requiring access to backup data in a mode associated with the request and/or request type, e.g., read, exclusive read, write, exclusive write, etc. If one or more other operations are currently being executed with respect to the backup data and/or a backup data set with which it is associated, it is determined if access to the backup data in the mode required to perform the requested operation is allowed given the access mode(s) associated with the one or more currently executing operations. If access in the mode required to perform the requested operation is allowed, the requestor is permitted to perform the requested operation. In some embodiments, a client is enabled to restore client-associated data comprising a subset of a body of backup data. An indication is received from a client computer that a restore operation is desired. Backup data associated with the client computer is provided to the client computer. The backup data associated with the client computer comprises a subset of a backup data set that includes both backup data associated with the client computer and backup data not associated with the client computer. In some embodiments, requests from multiple client computers to restore data are processed at the same time. In some embodiments, a backup of one or more client/user computers to a disc backup set is allowed at the same time as a transfer from the same disc backup set to a tape backup set. In some embodiments, a restore of backup data from a backup data set to one or more client/user computers is allowed at the same time as a transfer from the same disc backup set. In some embodiments, a simultaneous restore of three different files for three different users is allowed from a single backup set. In some embodiments, backup data is selected based at least in part on a restore point. A restore point refers to the state of data at a point in time. In some embodiments, the backup data comprises a backup data catalog.

Figure 1:
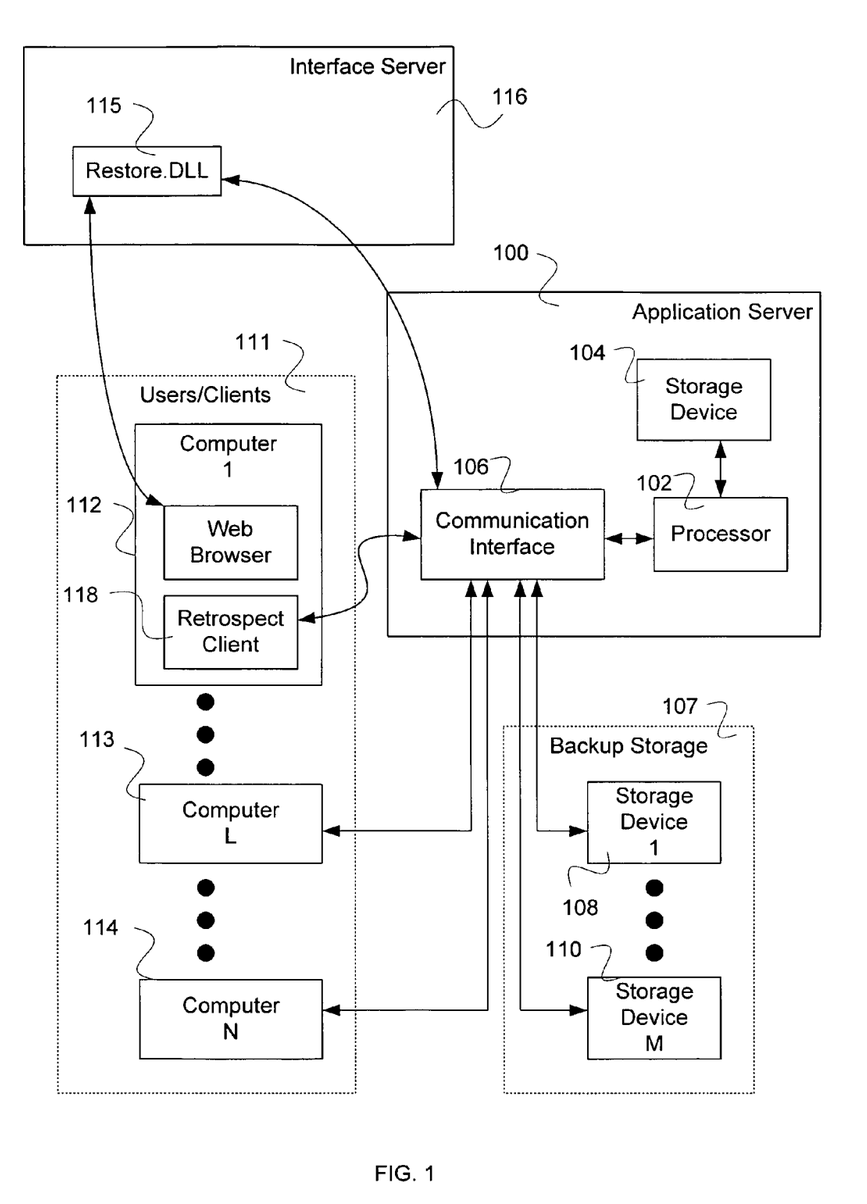
FIG. 1 illustrates an embodiment of a system for controlling backup data access.

FIG. 1 illustrates an embodiment of a system for controlling backup data access. In the example shown, application server 100 includes processor 102, which is configured in some embodiments to execute instructions that enable controlling backup data access; storage device 104 for storing instructions for processor 102; and communication interface 106 capable of receiving communications from and/or sending communications to one or more computers and/or one or more storage devices. In various embodiments, computer 100 comprises a backup server, a database server, a content management system, or any other application server. In various embodiments, communication interface 106 to the one or more computers and the one or more storage devices includes a local area network interface, a wide area network interface, an Ethernet interface, and/or a World Wide Web interface. The plurality of computers (represented in FIG. 1 by first computer 112, an $L^{th}$ computer 113, and $N^{th}$ computer 114) contain files/directories that may need to be accessed (for example, for being backed up or being backup to, for being part of a database, for holding content that is managed by a content management system). In some embodiments, application server 100 handles multiple simultaneous and/or co-pending requests to restore (for example, requests from more than one computer of users/clients 111). In some embodiments, multiple requests to restore are handled by controlling access to an application on application server 100 where multiple restore operations are allowed for predetermined combinations of requested restore operations and executing restore operations. The plurality of storage devices (represented in FIG. 1 by first storage device 108 and $M^{th}$ storage device 110) may contain files/directories that may need to be accessed (for example, for being backed up or being backup to, for being part of a database, for holding content that is managed by a content management system). In some embodiments, communication interface 106 connects to no storage devices. In some embodiments, application server 100 is configured perform a full and/or partial (e.g., incremental and/or differential) backup of one or more of computers 112-114 and/or storage devices 108-110. In some embodiments, all or part of the backup data that is incrementally backed up by application server 100 may be associated with source data associated with application server 100. In some embodiments, the backup data that is backed up may itself reside on application server 100, e.g., on a hard drive. In some embodiments, application server 100 is configured to manage content stored on one or more of computers 112-114 and/or storage devices 108-110.

In the example shown in FIG. 1, users/clients can interact with application server 100 by using a web browser (for example, the web browser in the $1^{st}$ computer 112) to communicate with application server 100 via interface server 116.

In some embodiments, interface server 116 comprises a web server. In the example shown, interface server 116 is configured to provide web access to application server 100 at least in part by using application.dll 115. In the example shown, interface server 116 is connected to communication interface 106 of application server 100. In some embodiments, interface server 116 and application server 100 are implemented in a single computer device. In some embodiments, the connection between the $1^{st}$ computer 112 and interface server 116 and the connection between interface server 116 and application server 100 are via one or more networks, such as a local area network, the interne, a wide area network, a wired network, and/or a wireless network, or any other way to connect.

In various embodiments, access to managed content data, backup data, or database content associate with application server 100 is achieved using a web interface to login into application server 100 via interface server 116 and to request via interface server 116 an operation with respect to content managed by application server 100. Login information is authenticated in some embodiments by having application server 100 exchange information with application client 118 on the client computer. In some embodiments, the authentication is performed using a communication path, port, protocol, or any other separate way to authenticate the remote access that is different and/or separate, at least in part, than the path used to send login information and/or request an operation. For example, in some embodiments, a client establishes web access and sends login information via http to port 80 of the interface server 116, and the interface server likewise, in an embodiment in which it is running in a separate computer, communicates with the application server 100 via a network communication, e.g., using http via port 80. The login information (e.g., username and associated password) are stored in some embodiments on the client computer, e.g., by a trusted agent such as application client 118 shown in FIG. 1, and login information sent by a client, e.g., by a web browser via the interface server 116 using http via port 80, is authenticated at least in part by having the application server communication via a private protocol and/or port with application client 118 to verify that the username and/or password supplied via the web (http) connection is valid.

Figure 2:
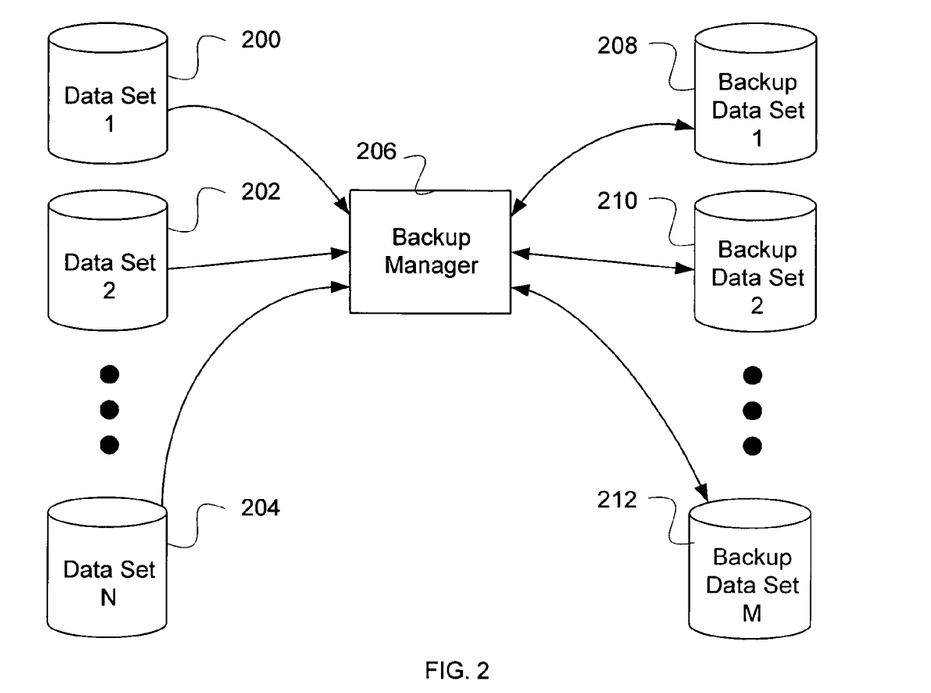
FIG. 2 illustrates an embodiment of a system for controlling backup data access.

FIG. 2 illustrates an embodiment of a system for controlling backup data access. In the example shown, a plurality of data sets (represented in FIG. 2 by first data set 200, second data set 202, and $N^{th}$ data set 204) are processed by backup manager 206 (the application) to create a plurality of backup data sets (represented in FIG. 2 by first backup data set 208, second backup data set 210, and $M^{th}$ backup data set 212). In the example shown, backup manager 206 also manages the plurality of backup data sets by performing full and/or partial (for example, incremental or differential backups) for the plurality of backup data sets. In other embodiments, incremental backups may be performed at least in part by a system or process other than a system or process used to create the backup data sets. In some embodiments, incremental backups may be performed with respect to a single backup data set comprising backup data associated with a single set of source data. In some embodiments, a user/client indicates a desire to perform a restore operation, a backup/restore server with which the backup manager 206 is associated authenticates the user/client by exchanging information with a backup/restore client on the user/client computer. In some embodiments, a data set (for example, data set 200) associated with a user/client computer (for example, $1^{st}$ computer 112 in FIG. 1) is backed up using a backup application, which is executing at least in part on an application server (for example, application server 100 of FIG. 1) to a backup data set (for example, backup data set 208) on a storage device (for example, 1st storage device 108 of FIG. 1). In some embodiments, one or more users/clients indicate a desire to perform a restore using a web browser which communicates with the backup/restore server via an interface server. In some embodiments, the backup/restore server authenticates the user/client by exchanging information with a trusted client via a different connection from the connection via which the indication of the desire to perform a restore operation was received.

Figure 3:
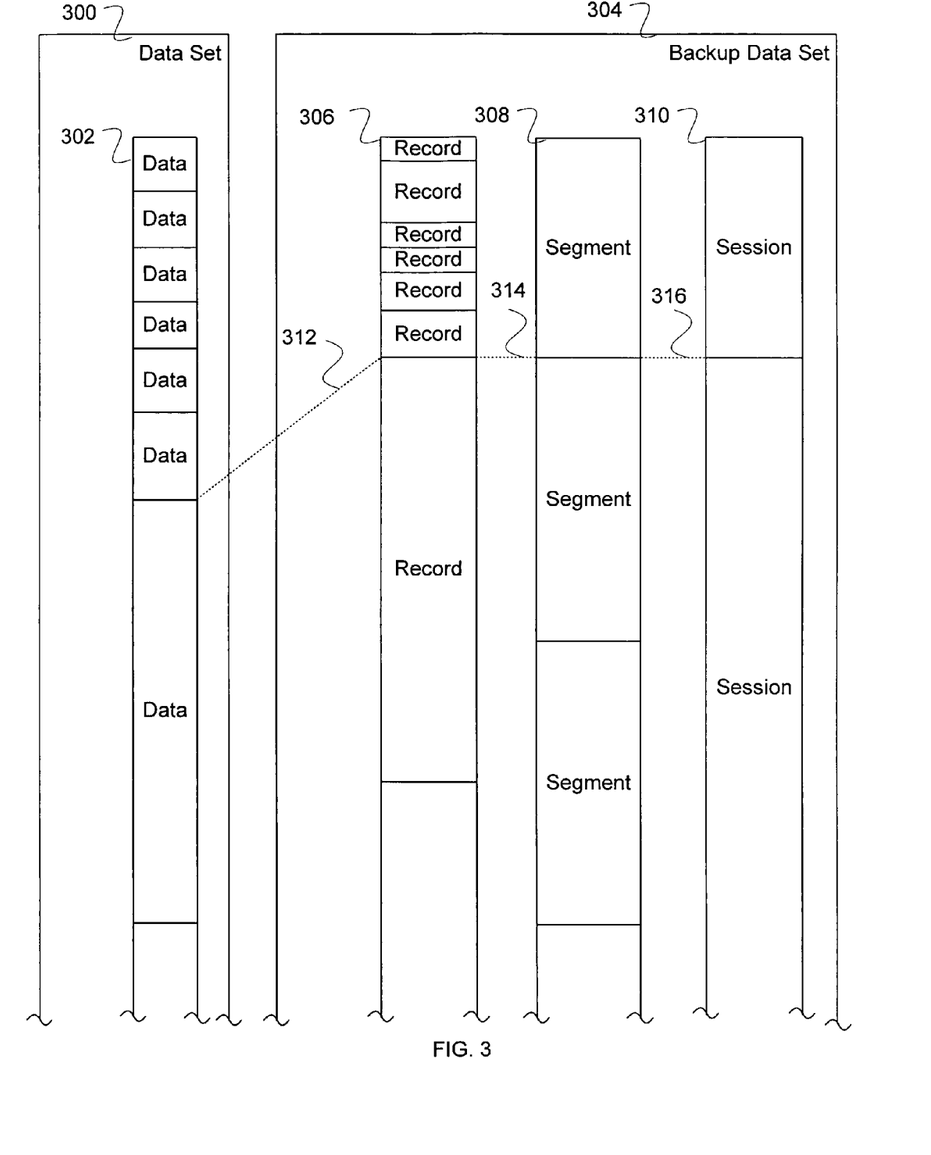
FIG. 3 illustrates an example of data organization in a source data set and a backup data set in one embodiment.

FIG. 3 illustrates an example of data organization in a source data set and a backup data set in one embodiment. In the example shown, data set 300 contains a plurality of data such as data 302. In some embodiments, data 302 comprises a file, a piece of a file, a directory, or a copy of a directory at a particular time. Backup data set 304 contains records corresponding to data in data set 300. For example, record 306 corresponds to data 302. Line 312 indicates a corresponding boundary between data in data set 300 and records in backup data set 304. Records can be smaller than data because the backup manager before storing the records uses data compression. Within backup data set 304 records are organized into sessions. Sessions are groups of backup data stored at the same time. Segment 308 contains record 306. Line 314 indicates a corresponding boundary between records and segments. Segments correspond to a contiguous piece of storage space. The end of a segment may be associated with the end of the backup (i.e. session), the end of the backup storage media, or a maximum limit size. In some embodiments, the maximum limit size is 600 megabytes. Sessions are stored in one or more segments. In the example shown, session 310 contains segment 308. Line 316 indicates a corresponding boundary between sessions and segments. A session may have more than one segment associated with it.

In some embodiments, a backup data set contains backup information in addition to backup data. Backup information may be stored in one or more records comprising a backup data set. In various embodiments, backup information may include a catalog of the contents of the backup set or data to recreate a catalog of the contents of the backup data set. In some embodiments the catalog includes one or more indexes of the source data set at particular backup times and the corresponding locations at which each element of source data is stored on backup media, also called a restore point index. In some embodiments, the backup information includes for each backup session (i.e., operation or event) session data identifying the data actually copied to backup media during the session. In some embodiments, if a file in the index of a data set at a particular backup time already exists in the backup data set because it had not changed from a previous backup, then the file is not stored again during the current backup session, and in some such embodiments the session data is associated with source data that has changed (or is new) since the last backup session. In some embodiments, a restore point index points to data in one or more sets of session data to indicate for each element of source data (e.g., each file and directory) the session(s) during which the element of source data as it existed at the time of the backup with which the restore point index is associated was stored. In some embodiments, the combination of the restore point index and the session data makes it possible to determine for each element of data associated with a restore point index the location on backup media of the corresponding backup data, which in turn makes it possible to use the backup data set to reconstruct the source data set in the form it existed at the time associated with the restore point index, e.g., at the time of a backup operation with which the restore point index is associated. The backup information stored with a backup data set may include other and/or different information about the backup data set, the source data set from which it originated, and/or the backup sessions through which the backup data set was generated.

Figure 4:
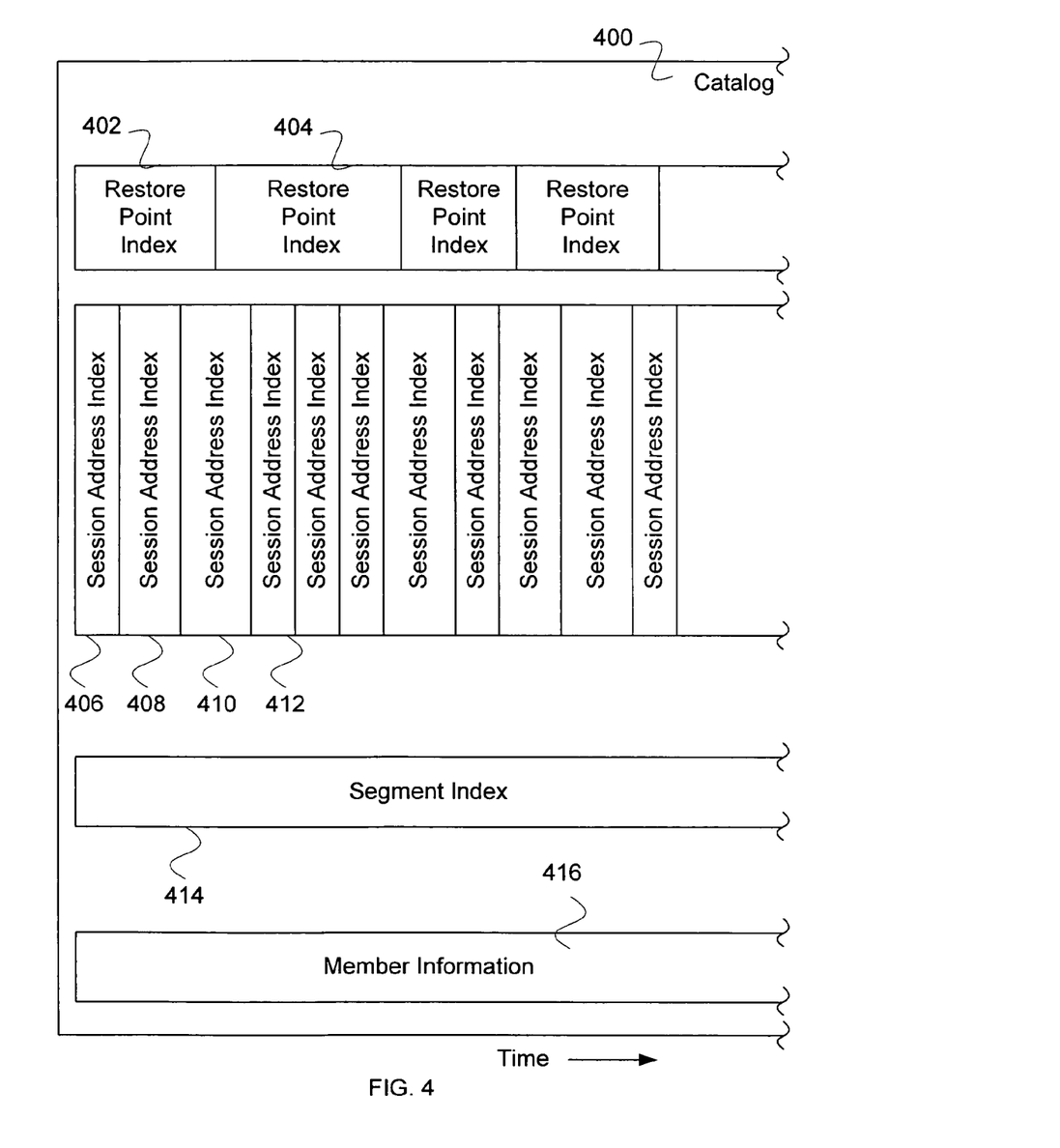
FIG. 4 illustrates an example of a catalog in one embodiment.

FIG. 4 illustrates an example of a catalog in one embodiment. In some embodiments, the catalog is similar to the catalog that can be found in U.S. Pat. No. 5,150,473 entitled DATA STORAGE FORMAT FOR ADDRESSABLE OR SEQUENTIAL MEMORY MEDIA filed Jan. 16, 1990, which is incorporated herein by reference. In the example shown, catalog 400 contains a plurality of restore point indexes and a plurality of session address indexes. As time passes, the number of restore point indexes and session address indexes increases. Restore point index 402 may point to files stored during a number of sessions. For example, restore point index 402 may point to files that are in session address index 406, session address index 408, and session address index 410. The session may not be before the restore point index time because, for example, during a verification step it was realized that a file was not properly saved to the backup set and so a save to the backup set is done subsequent to the session corresponding to the time of the restore point index. Subsequent restore point index 404 may point to files that are in session address index 406, session address index 410, and session address index 412 because, for example, the files indicated by restore point index 404 are no longer the same as any in session address index 408. Catalog 400 contains segment index 414. Segment index 414 is an index of addresses for the segments in the backup data set. In some embodiments, catalog 400 stores a session tree; for example, the session tree may be part of session address index 406.

In some embodiments, a user/client indicates a desire to restore files/data from a selected restore point associated with a backup data set that is accessible to the user/client. In some embodiments, the application server (for example, application server 100) authenticates the user/client by querying the user/client. In some embodiments, a user/client indicates a desire to restore files/data using a catalog. In some embodiments, a catalog's accuracy is maintained during multiple concurrent access to a catalog by requiring each process to make a copy of the catalog so that the process can control the catalog's state and so that the process does not disturb the catalog for other processes.

Figure 5:
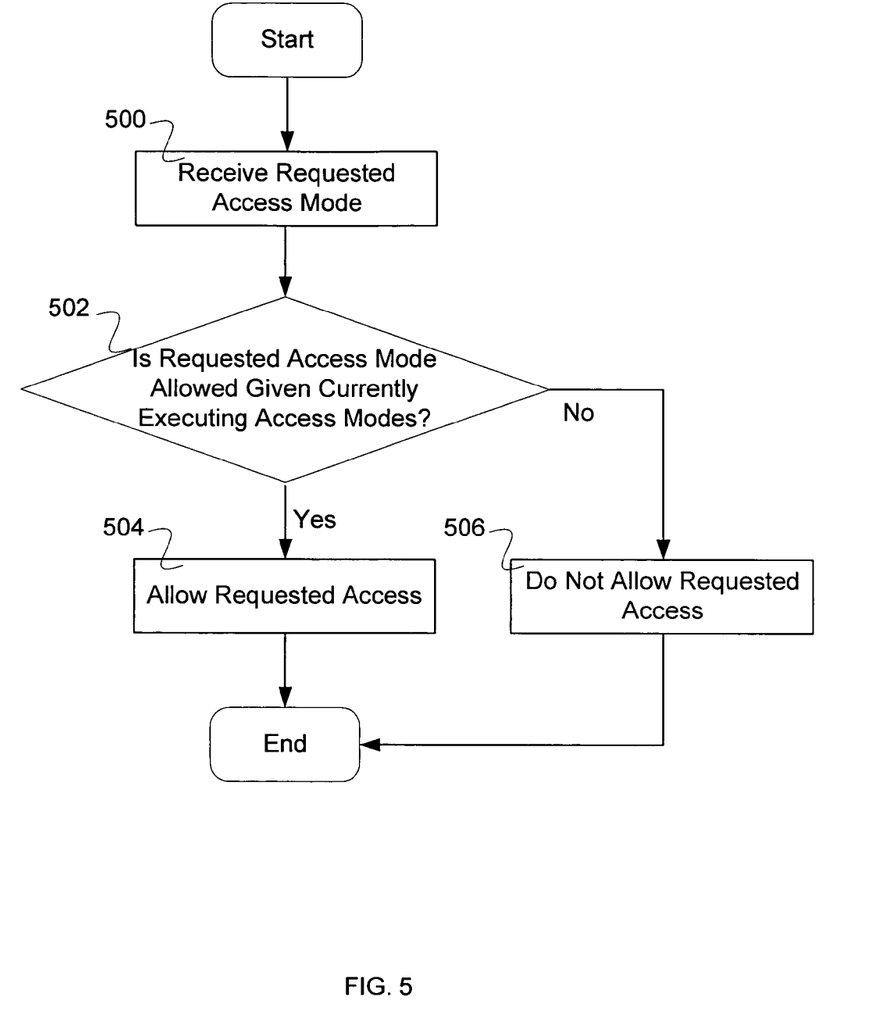
FIG. 5 is a flow diagram illustrating an embodiment of a process for controlling backup data access.

FIG. 5 is a flow diagram illustrating an embodiment of a process for controlling backup data access. In some embodiments, processor 102 of application server 100 is configured to execute, at least in part, the process of FIG. 5. In the example shown, in 500 a request is received to perform an operation that requires access to backup data in a mode associated with the request, e.g., a mode specified in the request and/or associated with the type of request. In various embodiments, a requested operation may require access to backup data in a read, write, exclusively read, or exclusive write mode, depending on the nature and/or type of operation. In various embodiments, read access mode is requested when restoring from a backup data set, when browsing backup data sets including browsing restore points, a catalog, and/or sessions, recovering from a disaster, or when transferring restore points or backup sets. In various embodiments, write access mode is requested when backing up, when writing a backup data set or when writing a restore point. In various embodiments, read exclusive access mode is requested when updating a catalog or when recreating a catalog. In various embodiments, write exclusive access mode is requested when grooming the backup set for files that are no longer required for the backup set. In 502, it is determined if the requested access mode is allowed given the access mode(s) associated with any currently executing operations. In some embodiments, a table is used to determine if the requested access mode is allowed given a currently executing access mode. If it is determined that the access mode is allowed, then in 504 the requested access is allowed, and the process ends. If it is determined that the access mode is not allowed, then in 506 the requested access is not allowed, and the process ends.

Figure 6A:
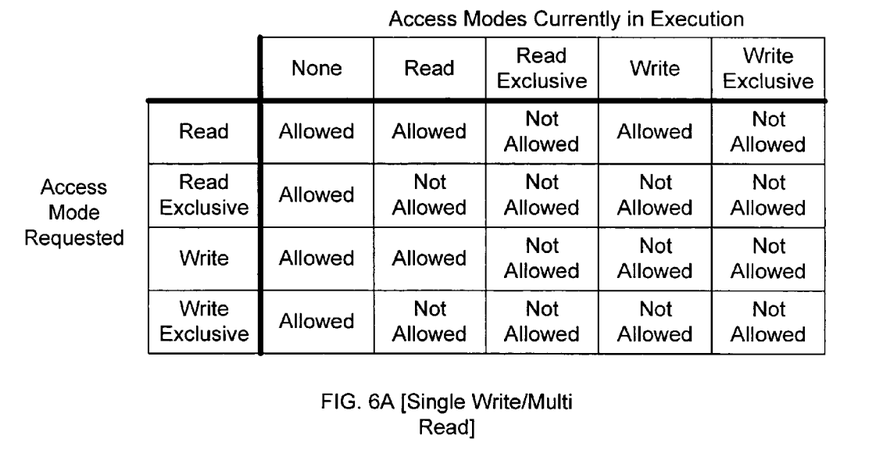
FIG. 6A is a table illustrating allowed access modes for a multi-read/single write system in one embodiment.

FIG. 6A is a table illustrating allowed access modes for a multi-read/single write system in one embodiment. In some embodiments, the table in FIG. 6A is used to as part of implementing 502 in FIG. 5. In the example shown, the table illustrates the allowed and disallowed combinations of requested access mode and currently executing access mode. The requested access modes (read, read exclusive, write, and write exclusive) are shown along the rows of the table, and the access modes that are currently in execution (none, read, read exclusive, write, and write exclusive) are shown along columns. If there are no currently executing modes (none column in the table), then any of the requested access modes is allowed. If the currently executing mode is exclusive (read exclusive or write exclusive columns in the table), then none of the requested access modes are allowed. If there is a currently executing read mode, then requested read and write access modes are allowed, but read exclusive and write exclusive access modes are not allowed since there is an existing access mode executing. If there is a currently executing write mode, then a requested read access mode is allowed; read exclusive and write exclusive access modes are not allowed, since there is an existing access mode executing; and the write access mode is also not allowed since there is an existing write access mode executing. In some embodiments, a verify operation is currently executing, which is comprised of a read access and a compare. If an access mode request is received while a verify is executing, access is evaluated as it is when there is an existing read access mode executing.

Figure 6B:
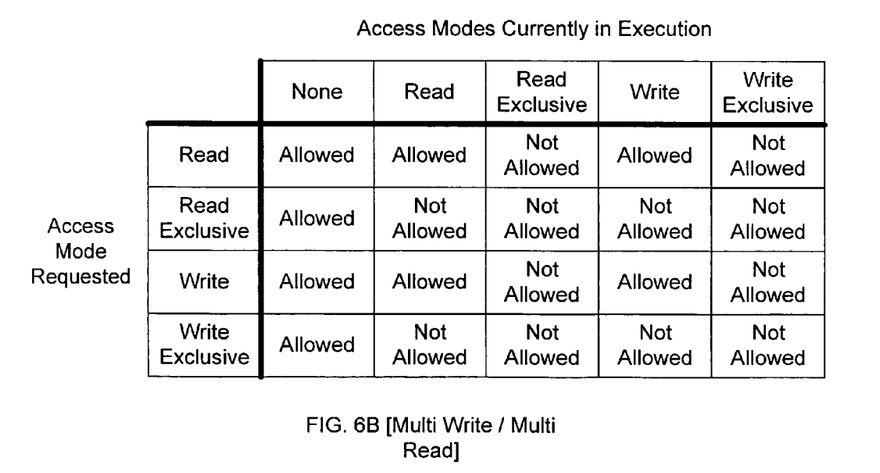
FIG. 6B is a table illustrating allowed access modes for a multi-read/multi-write system in one embodiment.

FIG. 6B is a table illustrating allowed access modes for a multi-read/multi-write system in one embodiment. In some embodiments, the table in FIG. 6A is used to as part of implementing 502 in FIG. 5. In the example shown, the table illustrates the allowed and disallowed combinations of requested access mode and currently executing access mode. The requested access modes (read, read exclusive, write, and write exclusive) are shown along the rows of the table, and the access modes that are currently in execution (none, read, read exclusive, write, and write exclusive) are shown along columns. If there are no currently executing modes (none column in the table), then any of the requested access modes is allowed. If the currently executing mode is exclusive (read exclusive or write exclusive columns in the table), then none of the requested access modes are allowed. If there is a currently executing read mode, then requested read and write access modes are allowed, but read exclusive and write exclusive access modes are not allowed since there is an existing access mode executing. If there is a currently executing write mode, then a requested read and write access modes are allowed and read exclusive and write exclusive access modes are not allowed, since there is an existing access mode executing. In some embodiments, a verify operation is currently executing, which is comprised of a read access and a compare. If an access mode request is received while a verify is executing, access is evaluated as it is when there is an existing read access mode executing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for controlling backup data access comprising:
   generating a first restore point index associated with a first backup time, wherein the first restore point index references data in a first set of backup session data for each of at least some elements that comprises source data, wherein the first backup session data set identifies elements of source data that was newly added or has changed since a previous backup session, and wherein the data in the first set of backup session data corresponds to elements of source data as the elements of source data existed at the first backup time;
   receiving, at an application server, a first request to perform a first restore operation in a first mode using the first restore point index, wherein the application server is configured to control access to backup data including by handling a plurality of simultaneous requests to perform restore operations, and wherein only a combination of operations that are one a plurality of predetermined combinations of operations in corresponding modes are permitted to be performed simultaneously;
   determining, at the application server, that a second restore operation is being performed in a second mode, wherein the second restore operation uses a second restore point index that also references data in the first set of backup session data, and wherein the second request requires access to the first set of backup session data in the second mode;
   determining, at the application server, that the first restore operation and the second restore operation comprises one of the plurality of predetermined combinations of operations in corresponding modes that are permitted to be performed simultaneously;
   determining, at the application server, that the first restore operation is allowed to be performed simultaneously as the second restore operation based at least in part on the determination that the first restore operation and the second operation comprises one of the plurality of predetermined combinations of operations in corresponding modes that are permitted to be performed simultaneously; and
   allowing, at the application server, the first restore operation to be performed simultaneously in the first mode as at least the second restore operation that is being performed in the second mode based at least in part on the determination that the first restore operation is allowed to be performed simultaneously as the second restore operation.

2. A method as in claim 1, wherein the second mode comprises a read mode for reading from the backup data.

3. The method as recited in claim 2, wherein the read mode is requested when restoring from a backup data set, recovering from a disaster, transferring a plurality of restore points or backup session data sets, or browsing a plurality restore points, a catalog, or one or more sets backup session data.

4. A method as in claim 1, wherein the second mode comprises a write mode for writing to the backup data.

5. The method as recited in claim 4, wherein the write mode is requested when backing up to a backup data set, writing the backup data set or a restore point.

6. A method as in claim 1, wherein the second mode comprises a read exclusive mode for reading from the backup data by only a single restore operation.

7. The method as recited in claim 6, wherein the read exclusive access mode is requested when updating a catalog or when recreating the catalog from at least a portion of the backup data.

8. The method as recited in claim 7, wherein the catalog comprises the first restore point index and the second restore point index, a plurality of backup session address indices, and an index of segments comprising the backup data.

9. The method as recited in claim 7, wherein in the event that the second restore operation comprises an update or a recreation of the catalog and the second mode comprises the read exclusive mode, determining, at the application server, that the first restore operation in the first mode is not allowed to be performed simultaneously as the second restore operation in the second mode.

10. A method as in claim 1, wherein the second mode comprises a write exclusive mode for writing to the backup data by only a single restore operation.

11. The method as recited in claim 10, wherein the write exclusive mode is requested when grooming a backup data set to remove one or more files that are no longer required by the backup data set.

12. A method as in claim 1, wherein in the event that the second mode comprises a single write mode, the first mode that is allowed for the first restore operation includes a read mode but not a write mode, a read exclusive mode, or a write exclusive mode.

13. A method as in claim 1, wherein in the event that the second mode comprises a multi-write mode, the first mode that is allowed for the first restore operation includes a read mode or a write mode but not a read exclusive mode or a write exclusive mode.

14. A method as in claim 1, wherein the application server uses a table to determine that the first restore operation and the second restore operation comprises one of the plurality of predetermined combinations of operations in corresponding modes that are permitted to be performed simultaneously.

15. The method as recited in claim 14, wherein the table comprises the plurality of predetermined combinations of operations in corresponding modes that are permitted to be performed simultaneously.

16. The method as recited in claim 15, wherein the table further comprises a plurality of predetermined combinations of operations in corresponding modes that are not permitted to be performed simultaneously.

17. A method as in claim 1, wherein the second restore operation comprises one of a plurality of restore operations that are being performed in one or more modes.

18. A method as in claim 1, wherein the first restore operation is associated with a subset of backup data associated with a first user and wherein the second restore operation was requested by a second user for a subset of backup data associated with the second user.

19. A method as in claim 1, wherein:
in the event that the second mode comprises a read exclusive mode or a write exclusive mode, not allowing the first restore operation in the first mode;
in the event that the second mode comprises a read mode, allowing the first restore operation in the event the first mode comprises a read mode or a write mode but not allowing the first restore operation in the event the first mode comprises a read exclusive mode or a write exclusive mode; and
in the event that the first restore operation in the first mode is allowed, allowing the first restore operation at least in part by allowing access to the backup data and the backup data catalog.

20. A method as in claim 1, wherein the first and the second restore point index each reference one or more session address indices corresponding to the one or more sets of backup session data.

21. A method as in claim 1, wherein the second mode comprises a write exclusive mode, wherein the second restore operation in the second mode comprises grooming one or more files of the backup data that are no longer required for the backup data.

22. A method as in claim 1, wherein the first restore operation comprises restoring a first file from the first set of backup session data, and the second restore operation comprises restoring a second file from the first of backup session data.

23. A method as in claim 1, wherein the backup media comprises disc backup, and wherein the first restore operation comprises a transfer of a first subset of the backup data from the disc backup to a tape backup and the second restore operation comprises a transfer of a second subset of the backup data to the disc backup.

24. A computer program product for controlling backup data access, the computer program product being embodied in a non-transitory computer readable storage medium and comprising computer instructions for:
generating a first restore point index associated with a first backup time, wherein the first restore point index references data in a first set of backup session data for each of at least some elements that comprises source data, wherein the first backup session data set identifies elements of source data that was newly added or has changed since a previous backup session, and wherein the data in the first set of backup session data corresponds to elements of source data as the elements of source data existed at the first backup time;
receiving, at an application server, a first request to perform a first restore operation in a first mode using the first restore point index, wherein the application server is configured to control access to backup data including by handling a plurality of simultaneous requests to perform restore operations, and wherein only a combination of operations that are one a plurality of predetermined combinations of operations in corresponding modes are permitted to be performed simultaneously;
determining, at the application server, that a second restore operation is being performed in a second mode, wherein the second restore operation uses a second restore point index that also references data in the first set of backup session data, and wherein the second request requires access to the first set of backup session data in the second mode;
determining, at the application server, that the first restore operation and the second restore operation comprises one of the plurality of predetermined combinations of operations in corresponding modes that are permitted to be performed simultaneously;
determining, at the application server, that the first restore operation is allowed to be performed simultaneously as the second restore operation based at least in part on the determination that the first restore operation and the second operation comprises one of the plurality of predetermined combinations of operations in corresponding modes that are permitted to be performed simultaneously; and
allowing, at the application server, the first restore operation to be performed simultaneously in the first mode as at least the second restore operation that is being performed in the second mode based at least in part on the determination that the first restore operation is allowed to be performed simultaneously as the second restore operation.

25. A computer program product as in claim 24, wherein:
in the event that the second mode comprises a read exclusive mode or a write exclusive mode, not allowing the first restore operation in the first mode;
in the event that the second mode comprises a read mode, allowing the first restore operation in the event the first mode comprises a read mode or a write mode but not allowing the first restore operation in the event the first mode comprises a read exclusive mode or a write exclusive mode; and
in the event that the first restore operation in the first mode is allowed, allowing the first restore operation at least in part by allowing access to the backup data and the backup data catalog.

26. A computer program product as in claim 24, wherein the first and the second restore point index each reference one or more session address indices corresponding to the one or more sets of backup session data.

27. A computer program product as in claim 24, wherein the second mode comprises a write exclusive mode, wherein the second restore operation in the second mode comprises grooming one or more files of the backup data that are no longer required for the backup data.

28. A computer program product as in claim 24, wherein the first restore operation comprises restoring a first file from the first set of backup session data, and the second restore operation comprises restoring a second file from the first of backup session data.

29. A computer program product as in claim 24, wherein the backup media comprises disc backup, and wherein the first restore operation comprises a transfer of a first subset of the backup data from the disc backup to a tape backup and the second restore operation comprises a transfer of a second subset of the backup data to the disc backup.

30. A system for controlling backup data access comprising:
a processor configured to generate a first restore point index associated with a first backup time, wherein the first restore point index references data in a first set of backup session data for each of at least some elements that comprises source data, wherein the first backup session data set identifies elements of source data that was newly added or has changed since a previous backup session, and wherein the data in the first set of backup session data corresponds to elements of source data as the elements of source data existed at the first backup time; and
an application server configured to:
receive a first request to perform a first restore operation in a first mode using the first restore point index, wherein the application server is configured to control access to backup data including by handling a plurality of simultaneous requests to perform restore operations, and wherein only a combination of operations that are one plurality of predetermined combinations of operations in corresponding modes are permitted to be performed simultaneously;
determine that a second restore operation is being performed in a second mode, wherein the second restore operation uses a second restore point index that also references data in the first set of backup session data, and wherein the second request requires access to the first set of backup session data in the second mode;
determine that the first restore operation and the second restore operation comprises one of the plurality of predetermined combinations of operations in corresponding modes that are permitted to be performed simultaneously;
determine that the first restore operation is allowed to be performed simultaneously as the second restore operation based at least in part on the determination that the first restore operation and the second operation comprises one of the plurality of predetermined combinations of operations in corresponding modes that are permitted to be performed simultaneously; and
allow the first restore operation to be performed simultaneously in the first mode as at least the second restore operation that is being performed in the second mode based at least in part on the determination that the first restore operation is allowed to be performed simultaneously as the second restore operation; and
a memory coupled with the processor, wherein the memory is configured to provide the processor with instructions.

31. A computer program product as in claim 24, wherein the first restore operation is associated with a subset of backup data associated with a first user and wherein the second restore operation was requested by a second user for a subset of backup data associated with the second user.

32. A system as in claim 30, wherein the first restore operation is associated with a subset of backup data associated with a first user and wherein the second restore operation was requested by a second user for a subset of backup data associated with the second user.

33. A system as in claim 30, wherein:
in the event that the second mode comprises a read exclusive mode or a write exclusive mode, not allowing the first restore operation in the first mode;
in the event that the second mode comprises a read mode, allowing the first restore operation in the event the first mode comprises a read mode or a write mode but not allowing the first restore operation in the event the first mode comprises a read exclusive mode or a write exclusive mode; and
in the event that the first restore operation in the first mode is allowed, allowing the first restore operation at least in part by allowing access to the backup data and the backup data catalog.

34. A system as in claim 30, wherein the first and the second restore point index each reference one or more session address indices corresponding to the one or more sets of backup session data.

35. A system as in claim 30, wherein the second mode comprises a write exclusive mode, wherein the second restore operation in the second mode comprises grooming one or more files of the backup data that are no longer required for the backup data.

36. A system as in claim 30, wherein the first restore operation comprises restoring a first file from the first set of backup session data, and the second restore operation comprises restoring a second file from the first of backup session data.

37. A system as in claim 30, wherein the backup media comprises disc backup, and wherein the first restore operation comprises a transfer of a first subset of the backup data from the disc backup to a tape backup and the second restore operation comprises a transfer of a second subset of the backup data to the disc backup.

* * * * *